US012761631B2

(12) United States Patent
Fischer et al.

(10) Patent No.: US 12,761,631 B2
(45) Date of Patent: Oct. 13, 2026

(54) INDUSTRIAL CONTROL SYSTEM AND METHOD FOR OPERATING THE INDUSTRIAL CONTROL SYSTEM

(71) Applicant: Siemens Aktiengesellschaft, Munich (DE)

(72) Inventors: Peter Fischer, Schwandorf (DE); Robert Weikert, Burggriesbach (DE)

(73) Assignee: Siemens Aktiengesellschaft, Munich (DE)

( * ) Notice: Subject to any disclaimer, the term of this patent is extended or adjusted under 35 U.S.C. 154(b) by 521 days.

(21) Appl. No.: 18/115,836

(22) Filed: Mar. 1, 2023

(65) Prior Publication Data

US 2023/0280722 A1 Sep. 7, 2023

(30) Foreign Application Priority Data

Mar. 3, 2022 (EP) .................................... 22160011

(51) Int. Cl.
*G05B 19/4155* (2006.01)

(52) U.S. Cl.
CPC .................... *G05B 19/4155* (2013.01); *G05B 2219/31449* (2013.01)

(58) Field of Classification Search
CPC .................. G05B 19/4155; G05B 2219/31449
USPC .......................................................... 702/107
See application file for complete search history.

(56) References Cited

U.S. PATENT DOCUMENTS

| | | | | |
|---|---|---|---|---|
| 6,400,547 | B1 * | 6/2002 | Pohl | H02J 13/00036 361/111 |
| 6,493,203 | B1 | 12/2002 | Ito et al. | |
| 2018/0011140 | A1 * | 1/2018 | Chaware | G01R 31/2884 |
| 2021/0138862 | A1 | 5/2021 | Yamamoto | |

FOREIGN PATENT DOCUMENTS

| | | |
|---|---|---|
| CN | 1308354 | 8/2001 |
| CN | 102332814 | 1/2012 |
| CN | 103997199 | 8/2014 |
| CN | 107070350 | 8/2017 |
| CN | 110098774 | 8/2019 |
| CN | 215682690 | 1/2022 |
| DE | 102020128323 | 5/2021 |

* cited by examiner

*Primary Examiner* — Shelby A Turner
*Assistant Examiner* — Xiuqin Sun
(74) *Attorney, Agent, or Firm* — Cozen O"Connor

(57) ABSTRACT

A method for operating an industrial control system that has an automation controller with a sequential program, an actuator which actuates a switching component of the power electronics, and an input module, wherein activation and deactivation operations of the switching component cause electromagnetic interference that corrupts a measured value recorded via the input module, where a temporal occurrence of the activation and deactivation operations and/or an operating state is predicted for the switching component, and where the prediction is used to perform a correction of the measured value at a prediction time instant or during a prediction time range with respect to the corruption caused by the electromagnetic interference.

8 Claims, 3 Drawing Sheets

INDUSTRIAL CONTROL SYSTEM AND METHOD FOR OPERATING THE INDUSTRIAL CONTROL SYSTEM

BACKGROUND OF THE INVENTION

1. Field of the Invention

The invention relates to an industrial control system and a method for operating the industrial control system that comprises an automation controller with a sequential program, an actuator configured to actuate a switching component of the power electronics, and an input module, where activation and deactivation operations of the switching component give rise to electromagnetic interference that corrupts a measured value recorded via the input module.

2. Description of the Related Art

Automation controllers, such as programmable logic controllers (PLCs), are often used in control cabinets with different components such as sensors, measurement transformers, motors, converters and inverters in complex industrial installations.

It is known that precisely converter- and/or inverter-operated motors locally generate a broad interference spectrum of electromagnetic interference. In particular, on account of the proximity in the control cabinet as well as the necessarily close wiring, the operation of a converter/inverter-operated motor can interfere with the analog inputs of the programmable logic controller and result in an additional measurement error.

SUMMARY OF THE INVENTION

In view of the foregoing, it is therefore an object of the present invention to provide a method or a system in which interference to measured values caused by activation operations can be corrected or compensated.

This and other objects and advantages are achieved in accordance with the invention by method in which a temporal occurrence of an activation and deactivation operations and/or an operating state is predicted for a switching component, where the prediction is used to perform a correction of the measured value at a prediction time instant or during a prediction time range with respect to the corruption caused by the electromagnetic interference.

The prediction is further improved thereby, where a temporal occurrence of program code instructions in the sequential program is used to predict the activation and deactivation operations and/or the operating state.

This results in a correction, for example, of an analog measured value when a motor is started up and a correction value as a function of the stationary rotational speed of the motor. The start-up of the motor can be seen from the program code instructions. In the automation component with its sequential program, the time instant at which a release is set for an inverter is known. The effects of the motor started by the inverter can be identified in the temporal course of the analog value of a sensor. For example, an increased starting current of the motor or a further frequency mixture of the inverter as a result of the run-up rotational speed of the rotating field can be identified around the output of the inverter. Both for the run-up and for stationary operation, the effect of the motor on the analog inputs can be analyzed.

There are essentially three different states:

analog value with deactivated motor, analog value during motor run-up, analog value with static motor rotational speed, analog value during active/passive braking of the motor.

This results in a solution approach for correcting the analog value when the motor is started up and a correction value as a function of the stationary rotational speed of the motor.

The method can be improved further thereby, where a recording module is additionally operated such that, during operation of the industrial control system, a learning process is performed for a neural network in the recording module, a monitored learning being carried out here, where a predetermined output to be learned of the prediction time instants through the temporal occurrence of the program code instructions in the sequential program with the actually occurring electromagnetic interference is monitored via the sensor data of sensors that record electromagnetic interference at the switching components and/or at drives to be activated, and the actual time instants of the interference are determined and made available to the neural network as additional input variables from the sensor data. This learning process results in a neural network that subsequently works independently of the automation device and can be used at a later time directly on an input module for interference compensation purposes.

It is furthermore advantageous if the input module is operated with a digital filter, which stabilizes the recorded measured value against interfering influences, the prediction here being used to parameterize the filter and the interfering influences being minimized with the parameterized filter.

Alternatively, there is the possibility to use an artificial intelligence AI as needed either to determine the length of the required digital filter or to create a digital filter design (FIR, IIR) in a targeted manner and transfer this to the affected analog modules. In this way, the correction already occurs in the module. In this case, shorter delay times are possible with equal or better interference suppression.

The objects and advantages in accordance with the invention are likewise achieved by an industrial control system, where predictor provided which is configured to predict a temporal occurrence of the activation and deactivation operations and/or an operating state for the switching component, where the industrial control system also has a corrector that is configured to correct the measured value at a prediction time instant or during a prediction time range with respect to the corruption caused by the electromagnetic interference.

Advantageously, here the predictor is further configured to evaluate a temporal occurrence of program code instructions in the sequential program to predict the activation and deactivation operations and/or the operating state of the switching component of the power electronics.

With respect to the use of artificial intelligence AI, it is advantageous if a recording module with a neural network is available and configured to perform a learning process during operation of the industrial control system, the recording module here being further configured to implement a monitored learning, in which a predetermined output to be learned of the prediction time instants through the temporal occurrence of the program code instructions in the sequential program with the actually occurring electromagnetic interference is monitored via sensor data of sensors that are arranged on the switching components and/or on drives to be activated, where the recording module is configured to determine the actual time instants of the interference from the sensor data and make them available to the neural network as additional input variables.

With a neural network trained in such a way, an error correction can also occur directly on the input module and does not first need to be performed circuitously in the programmable logic controller.

In a further embodiment, the input module is provided with a digital filter, which stabilizes the recorded measured value against interfering influences, the input module here being configured to parameterize the filter via the prediction and to minimize the interfering influences with the parameterized filter.

It is now possible, for example, to set the length of a filter time precisely. The longer the selected filter time, the greater the stability of a measured value against interfering influences; on the other hand, a higher or longer filter time also results in a slower data rate of the measured values and more sluggish response times to actual measured value changes. With the knowledge of the prediction time, an optimum is therefore reached between minimal interfering influences and a maximum data rate, where the filter time can be adjusted optimally.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings show an exemplary embodiment of the invention, in which.

DESCRIPTION OF THE EXEMPLARY EMBODIMENTS

Figure 1:
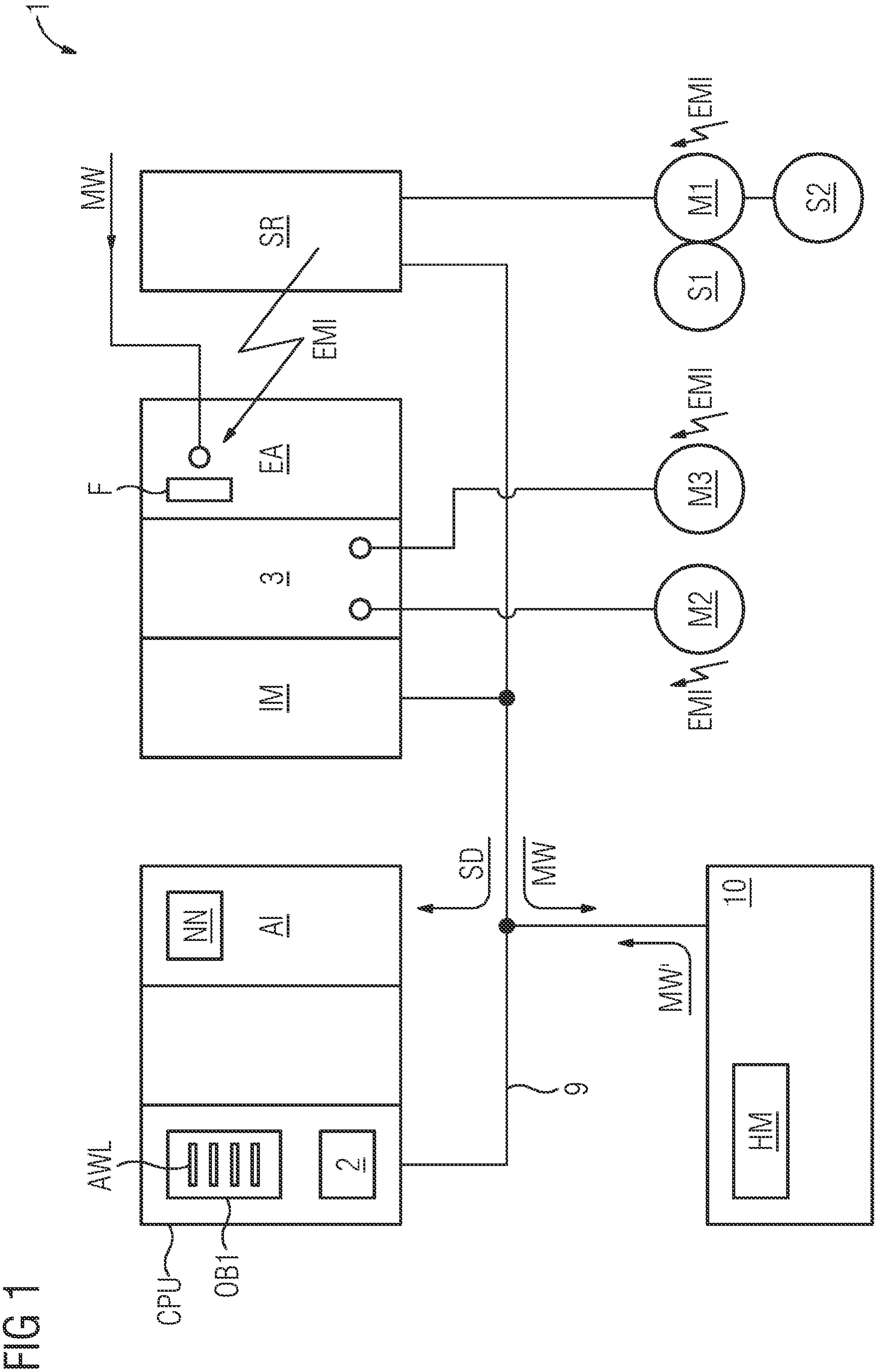
FIG. 1 shows a general view of an industrial control system in accordance with the invention.

FIG. 1 shows an industrial control system 1 comprising an automation controller CPU with a sequential program OB1. The sequential program OB1 contains program code instructions AWL; one of the program code instructions AWL will, at a specific time instant, ultimately activate the switching component SR via an actuator 2 for actuating power electronics. Alternatively, a program code instruction AWL will actuate a motor directly via an output module 3. Accordingly, the automation controller CPU is configured with the actuator 2 for actuating the switching component SR of the power electronics and a measured value MW can be recorded via an input module EA. Activation and deactivation operations EV, AV (see FIG. 2) of the switching component SR give rise to (cause) electromagnetic interference EMI, which is recorded via the input module EA and can corrupt the measured value.

The industrial control system 1 therefore comprises a predictor 10, which is configured to predict a temporal occurrence of the activation and deactivation operations EV, AV and/or a time duration of an operating state BZ for the switching component SR. A corrector KM is also available, which is configured to correct the measured value MW at a prediction time instant VZ or during a prediction time range VZB with respect to the corruption by the electromagnetic interference EMI. If the switching component SR, for example, an inverter, is activated, then this inverter in turn activates a first motor M1. A first sensor S1 and a second sensor S2 is arranged on the first motor M1. Both the actuation of the switching component SR or of the inverter and also in turn the actuation of the first motor M1 give rise to (cause) electromagnetic interference EMI. The automation controller CPU is connected communicatively via a bus 9 to the switching component SR and the input module EA. In this special case, the input module EA is coupled to an interface module IM via a backplane bus to an additional output module 3. If the input module EA records a measured value MW and activates the switching component SR at a certain time instant and electromagnetic interference EMI is in turn transferred to the measured value MW, then a corrupted measured value MW is transferred over the bus 9 to the predictor 10. A corrector KM is embedded in the predictor 10 and corrects the measured value MW based on the now known prediction time instant VZ. The predictor 10 can send a corrected measured value MW' to the automation controller CPU.

The predictor 10 is further configured to evaluate a temporal occurrence of the program code instructions AWL in the sequential program OB1 such that the activation and deactivation operations EV, AV and/or the operating state BZ of the switching component SR are included in the prediction.

Here, a recording module AI is used as an aid. The recording module AI has a neural network NN, which is configured to carry out a learning process for the neural network NN during operation of the industrial control system 1, the recording module AI here being further configured to implement a monitored learning, in which a predetermined output to be learned of the prediction time instants through the temporal occurrence of the program code instructions AWL in the sequential program OB1 with the actually occurring electromagnetic interference is monitored via the sensor data of the first sensor S1 and the second sensor S2, which are arranged in the vicinity of the switching component SR or directly on a first motor. The recording module AI is configured to determine the actual time instants of the interference from the sensor data SD and to make them available to the neural network NN as additional input variables.

The input module EA has a digital filter F, which is configured to stabilize the recorded measured value against interfering influences, the input module EA here being configured to parameterize the filter F accordingly via the prediction. The interfering influences can likewise be minimized with the parameterized filter F. A long filter time increases the stability of a measured value MW against interfering influences, for example. However, a higher filter time also results in a slower data rate of the measured values MW and more sluggish response times RZ.

An optimally set filter time of the filter F on the input module EA is thus advantageous.

Figure 2:
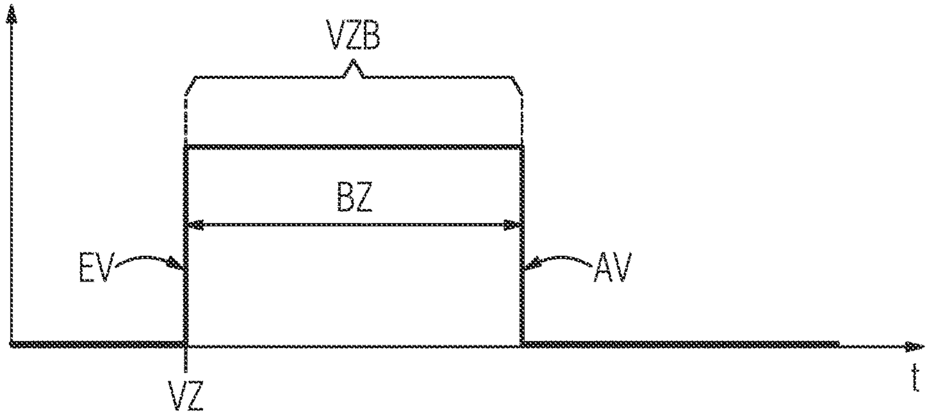
FIG. 2 shows a temporal diagram of activation operations and deactivation operations with a prediction time instant in accordance with the invention.

FIG. 2 shows the temporal course of an activation operation EV and a deactivation operation AV. The activation operation EV starts at a prediction time instant VZ. The switching component SR is now in an operating state BZ for a prediction time range VZB. When the time of the prediction time range VZB ends, the deactivation operation AV coincides temporally with the end of the prediction time range VZB.

Figure 3:
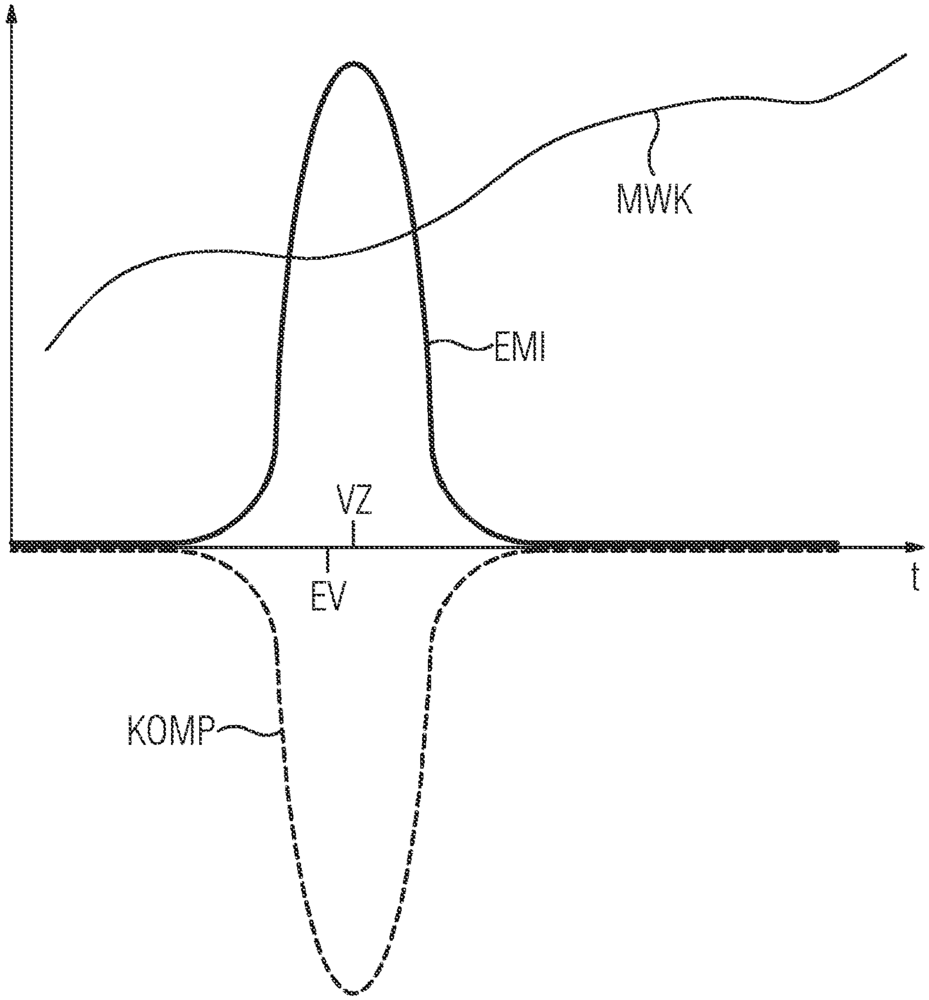
FIG. 3 shows a graphical plot of a measured value characteristic of a measured value with a compensation in accordance with the invention.

FIG. 3 shows a measured value characteristic MWK of the measured values MW. This starts for example with an activation operation EV; a motor M1 is started and electromagnetic interference EMI occurs. The prediction time instant VZ is now known. As a result, it is possible to add a compensation KOMP temporally to the measured value MW or the measured value MWK around the occurrence of the electromagnetic interference EMI, and thus obtain a corrected measured value MW or a corrected measured value characteristic MWK.

Figure 4:
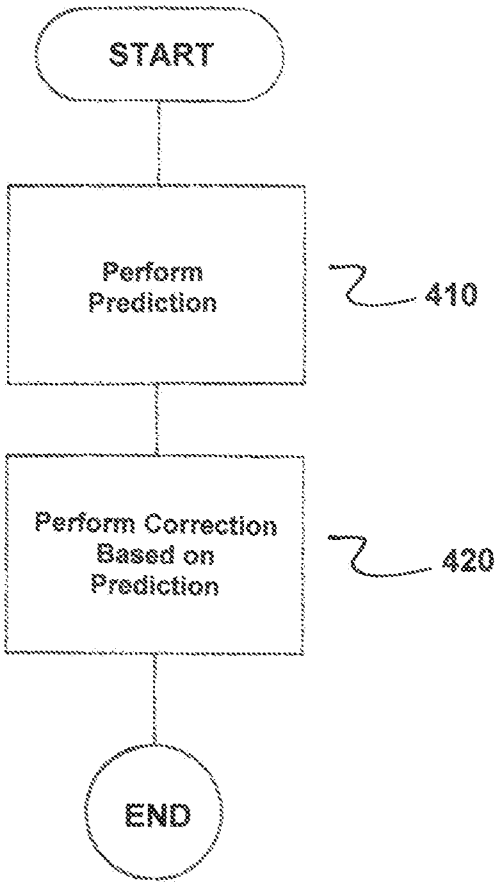
FIG. 4 is a flowchart of the method in accordance with the invention.

FIG. 4 is a flowchart of the method for operating an industrial control system 1 including an automation controller CPU having a sequential program OB1, an actuator 2 configured to actuate a switching component SR of the power electronics, and an input module EA, where activation and deactivation operations EV, AV of the switching component SR causes electromagnetic interference EMI that corrupts the measured value MW recorded via the input module EA.

The method comprises predicting a temporal occurrence of the activation and deactivation operations EV, AV and/or an operating state BZ for the switching component SR, as indicated in step 410.

Next, a correction of the measured value MW is performed based on the prediction at a prediction time instant or during a prediction time range VZB with respect to the corruption caused by the electromagnetic interference EMI as indicated in step 420.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an industrial control system including an automation controller having a sequential program, an actuator configured to actuate a switching component of power electronics of the industrial control system, and an input module, activation and deactivation operations of the switching component causing electromagnetic interference which corrupts a measured value recorded via the input module, the method comprising:

operating the industrial control system and activating and deactivating the switching component during operation of the industrial control system;

predicting at least one of (i) a temporal occurrence of the activation and deactivation operations and (ii) an operating state of the switching component; and adding a compensation to the measured value to perform a correction of the measured value based on the prediction at a prediction time instant or during a prediction time range with respect to the corruption caused by the electromagnetic interference generated by the activation and deactivation operations of the switching component to reduce the electromagnetic interference which corrupts the measured value recorded via the input module;

wherein a temporal occurrence of program code instructions in the sequential program is utilized to predict at least one of (i) the activation and deactivation operations and (ii) the operating state;

wherein in addition a recording module is operated such that, during operation of the industrial control system, a learning process is implemented for a neural network in the recording module, a monitored learning being implemented here;

wherein a predetermined output to be learned of the prediction time instants through a temporal occurrence of the program code instructions in the sequential program with actually occurring electromagnetic interference is monitored via sensor data of sensors which record electromagnetic interference on at least one of switching components and drives to be activated; and wherein from the sensor data the actual time instants of the interference are determined and made available to the neural network as additional input variables.

2. The method as claimed in claim 1, wherein the input module is operated with a digital filter which stabilizes the recorded measured value against interfering influences, the prediction being utilized here to parameterize the filter and the interfering influences being minimized with the parameterized filter.

3. The method as claimed in claim 1, wherein the input module is operated with a digital filter which stabilizes the recorded measured value against interfering influences, the prediction being utilized here to parameterize the filter and the interfering influences being minimized with the parameterized filter.

4. An industrial control system comprising:

an automation controller having a sequential program;

an actuator configured to actuate a switching component of power electronics of the industrial control system, the switching component being activated and deactivated during operation of the industrial control system;

an input module, activation and deactivation operations of the switching component causing electromagnetic interference which corrupts a measured value recorded via the input module;

a predictor configured to predict a temporal occurrence of at least one of (i) the activation and deactivation operations and (ii) an operating state of the switching component;

a corrector configured to correct the measured value by adding a compensation to the measured value at a prediction time instant or during a prediction time range with respect to the corruption by the electromagnetic interference generated by the activation and deactivation operations of the switching component to reduce the electromagnetic interference which corrupts the measured value recorded via the input module; and a recording module including a neural network, the recording module being configured to perform a learning process for the neural network during operation of the industrial control system, the recording module being further configured to implement a monitored learning, in which a predetermined output of the prediction time instants through the temporal occurrence of the program code instructions in the sequential program with the actually occurring electromagnetic interference to be learned is monitored via sensor data of sensors which are arranged on at least one of (i) the switching components and (ii) drives to be activated; and wherein the recording module is further configured to determine actual time instants of the interference from the sensor data and provide said determined actual time instants to the neural network as additional input variables.

5. The industrial control system as claimed in claim 4, wherein the predictor is further configured to evaluate a temporal occurrence of program code instructions in the sequential program to predict at least one of (i) the activation and deactivation operations and (ii) the operating state of the switching component of the power electronics of the industrial control system.

6. The industrial control system as claimed in claim 5, wherein the input module is provided with a digital filter which stabilizes the recorded measured value against interfering influences, the input module being configured to parameterize the filter via the prediction and to minimize the interfering influences with the parameterized filter.

7. The industrial control system as claimed in claim 4, wherein the input module is provided with a digital filter which stabilizes the recorded measured value against interfering influences, the input module being configured to parameterize the filter via the prediction and to minimize the interfering influences with the parameterized filter.

8. The industrial control system as claimed in claim 4, wherein the input module is provided with a digital filter which stabilizes the recorded measured value against interfering influences, the input module being configured to parameterize the filter via the prediction and to minimize the interfering influences with the parameterized filter.

* * * * *